E. THIRY & J. W. SCHERMERHORN.
FLUSH DEVICE FOR CLOSETS.
APPLICATION FILED JUNE 27, 1910.
1,015,719.
Patented Jan. 23, 1912.
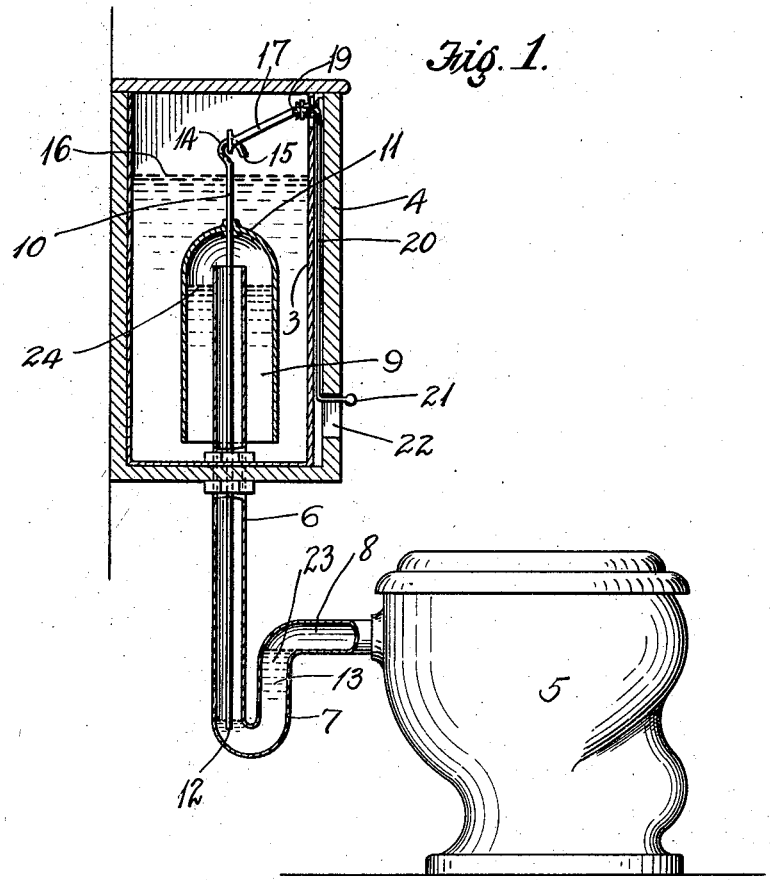
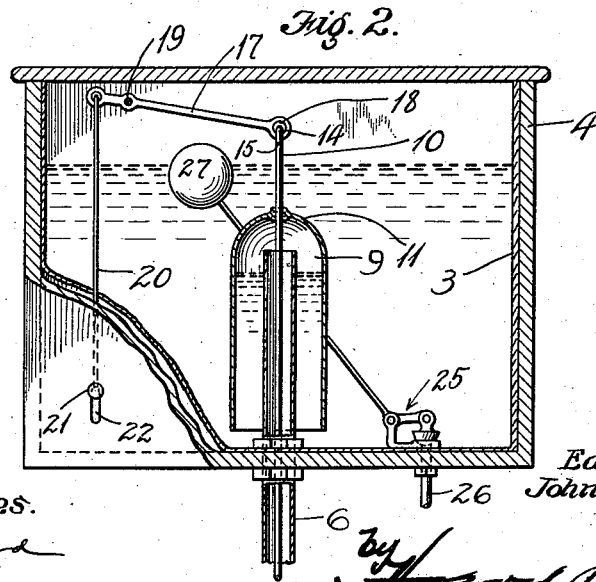
Witnesses.
E. R. Pollard
F. D. Ammen
Inventors.
Edward Thiry and
John W. Schermerhorn
by Howard Strause
Attys.

UNITED STATES PATENT OFFICE.

EDWARD THIRY AND JOHN W. SCHERMERHORN, OF PASADENA, CALIFORNIA; SAID SCHERMERHORN ASSIGNOR TO SAID THIRY.

FLUSH DEVICE FOR CLOSETS.

1,015,719.  Specification of Letters Patent.  Patented Jan. 23, 1912.

Application filed June 27, 1910. Serial No. 568,967.

*To all whom it may concern:*

Be it known that we, EDWARD THIRY and JOHN W. SCHERMERHORN, citizens of the United States, residing at Pasadena, county of Los Angeles, State of California, have invented new and useful Improvements in Flush Devices for Closets, of which the following is a specification.

This invention relates to flushing devices such as used in connection with closets.

The object of the invention is to produce a flush tank which need not be supported at a great elevation and in which the flushing operation can be effected without the use of a flush valve. The device operates pneumatically.

In the drawing forming a part of the annexed specification, Figure 1 is a vertical section through a flush tank constructed according to our invention and showing the closet in side elevation to which it is attached. Fig. 2 is a longitudinal section through the flush tank and portion of the tank being shown in elevation.

Referring more particularly to the parts 3 represents a reservoir or tank which is mounted in a suitable wooden box or case 4 at a slight elevation above the bowl 5. From the reservoir a flush pipe 6 extends downwardly, the mouth of the pipe being disposed at an elevation within the tank as indicated. The lower portion of this pipe is bent upwardly so as to form a trap 7 and beyond this trap a horizontal extension 8 is formed which connects with the rear side of the bowl as shown. Over the upper end of the pipe 6 a bell 9 is held, said bell being open at its lower end and closed at its upper end. This bell is supported on a tubular stem 10 which extends downwardly and makes an air tight connection with the dome 11 of the bell. This tube extends downwardly within a flush pipe 6 and the lower end or mouth 12 of the tube is disposed in the trap 7 and at such a point in the trap that it is normally immersed in the water 13 which is normally held in the trap as indicated in Fig. 1. The stem 10 extends upwardly from the bell and its upper end is formed into a hook 14, the upper mouth 15 of the tube being open to the interior of the tank above the water level 16, and this hook 14 is supported by a flush lever 17, having an eye 18 through which the hook passes as indicated in Fig. 2. This lever is pivotally supported at 19 and has a short arm to which a link 20 is attached, said link hanging downwardly and being provided with a button 21 which passes through a vertical slot 22 in the forward wall of the box 4 as indicated.

In the normal condition of the apparatus the trap 13 supports a water column 23 and the water within the bowl 9 is then at about the line 24. Under these conditions the air under the dome of the bowl and within the flush pipe 6 is under a state of compression corresponding to the effective water head, in the trap 7 and the tank. If the button 21 is pushed downwardly the lever 17 will raise the bell 9 and the mouth 12 of the air tube 10 which is normally sealed by the water in the trap becomes unsealed and as soon as it does so it permits the air in the flush pipe and the bell to escape upwardly through the air tube and through the mouth 15. This gives a decrease of pressure within the bell. This unbalancing of the pressure produces an upward movement of the water in the bell 9 around the flush pipe 6 and this water then pours down the flush pipe 6, and all of the water in the flush tank will be siphoned through the bowl. After the flushing process ceases there will be a quantity of water held in the trap so that the device can be operated repeatedly. The tank is provided with a suitable ball cock 25 which closes off the water automatically, which comes through the service pipe 26, said ball cock being provided with a float 27 which closes the valve when the water level in the tank rises to a predetermined point.

What we claim is:—

1. In flushing apparatus, in combination, a tank, a flush pipe extending upwardly into the interior of said tank and having a trap at the lower end thereof, a bell mounted in said tank closed at its upper end and opened at its lower end, said bell being disposed over the upper end of said flush pipe, but out of contact therewith, a tube carrying said bell and passing downwardly into the interior of said flush pipe, said tube having its lower mouth disposed within said trap, the lower mouth of said tube being normally sealed by the water in said trap, said tube being open at its upper end, and means for raising said tube so that the lower mouth thereof withdraws from the water in said trap thereby permitting the escape of air through said tube from said flush pipe and from the interior of said bell.

2. In apparatus of the class described, in combination, a tank, a flush pipe extending upwardly into the interior of said tank, said flush pipe having a trap connected with the lower end thereof adapted to contain a water column, a bell open below, closed above and disposed over the mouth of said flush pipe, an air tube passing downwardly through said flush pipe and having its lower mouth normally immersed in the water of said trap, and means for raising the mouth of said air tube above the water in said trap to liberate the air from the interior of said flush pipe and said bell, through said release tube.

In witness that we claim the foregoing we have hereunto subscribed our names this 18th day of June, 1910.

EDWARD THIRY.
JOHN W. SCHERMERHORN.

Witnesses:
F. D. AMMEN,
EDMUND A. STRAUSE.

Copies of this patent may be obtained for five cents each, by addressing the "Commissioner of Patents, Washington, D. C."